(12) United States Patent
Xie et al.

(10) Patent No.: US 9,041,372 B2
(45) Date of Patent: May 26, 2015

(54) WIDE OUTPUT VOLTAGE RANGE SWITCHING POWER CONVERTER

(71) Applicant: Analog Devices Technology, Hamilton (BM)

(72) Inventors: Renjian Xie, Shenzhen (CN); Qingyi Huang, Shenzhen (CN); Yingyang Ou, Shenzhen (CN)

(73) Assignee: Analog Devices Global (BM)

( * ) Notice: Subject to any disclaimer, the term of this patent is extended or adjusted under 35 U.S.C. 154(b) by 122 days.

(21) Appl. No.: 13/799,492

(22) Filed: Mar. 13, 2013

(65) Prior Publication Data
US 2014/0268890 A1    Sep. 18, 2014

(51) Int. Cl.
G05F 1/00 (2006.01)
H02M 3/158 (2006.01)
H02M 1/00 (2006.01)

(52) U.S. Cl.
CPC ...... *H02M 3/1582* (2013.01); *H02M 2001/007* (2013.01)

(58) Field of Classification Search
USPC ............ 307/11, 17; 363/17, 21.12, 21.14, 65, 363/68, 86, 95; 323/222, 271, 282–285
See application file for complete search history.

(56) References Cited

U.S. PATENT DOCUMENTS

| | | | |
|---|---|---|---|
| 6,201,714 B1 * | 3/2001 | Liang | 363/21.14 |
| 7,443,147 B2 * | 10/2008 | Kasai et al. | 323/259 |
| 8,274,266 B2 * | 9/2012 | Engelhardt et al. | 323/259 |
| 2010/0164279 A1 * | 7/2010 | Dishman et al. | 307/17 |
| 2010/0327833 A1 * | 12/2010 | Singnurkar | 323/282 |
| 2011/0074356 A1 * | 3/2011 | Yamazaki et al. | 320/134 |
| 2011/0227550 A1 * | 9/2011 | Walters et al. | 323/283 |

* cited by examiner

*Primary Examiner* — Nguyen Tran
(74) *Attorney, Agent, or Firm* — Schwegman Lundberg & Woessner, P.A.

(57) ABSTRACT

A switching power converter includes a voltage source that provides an input voltage Vin to an unregulated DC/DC converter stage and at least one buck-boost converter stage to produce a desired output voltage Vout. The unregulated DC/DC converter stage is adapted to provide an isolated voltage to the at least one regulated buck-boost converter stage, wherein the unregulated DC/DC converter stage comprises a transformer having a primary winding and at least one secondary winding and at least one switching element coupled to the primary winding. The at least one buck-boost converter stage is arranged to operate in a buck mode, boost mode or buck-boost mode in response to a mode selection signal from a mode selection module. By influencing the pulse width modulation output power controller the at least one buck-boost converter stage is arranged to produce one or multiple output voltages.

21 Claims, 13 Drawing Sheets

| LOGIC STATE SIGNAL 120 | LOGIC STATE SIGNAL 122 | MODE | Q7 | Q8 | Q9 | Q10 |
|---|---|---|---|---|---|---|
| 0 | 0 | BUCK | SWITCHING | SWITCHING | 0 (ALWAYS OFF) | 1 (ALWAYS ON) |
| 0 | 1 | DOES NOT OCCURR | | | | |
| 1 | 0 | BUCK-BOOST | SWITCHING | SWITCHING | SWITCHING | SWITCHING |
| 1 | 1 | BOOST | 1 (ALWAYS ON) | 0 (ALWAYS OFF) | SWITCHING | SWITCHING |

WIDE OUTPUT VOLTAGE RANGE SWITCHING POWER CONVERTER

BACKGROUND OF THE INVENTION

1. Field of the Invention

Embodiments of the invention relate to DC-DC converters and, more particularly, to a multi-stage converter having a wide output voltage range and a control scheme to control operation of such converters.

2. Description of the Related Art

DC-DC converters are a class of power converter. They are used to convert a direct current (DC) signal from one voltage level to another. These converters are commonly used in electronic devices that are powered by regulated DC voltage. DC-DC converters are particularly useful in applications that have several different sub-systems, requiring several different voltage input levels.

DC-DC converters that use a magnetic energy storage mechanism employ inductors or transformers. The output voltage is controlled by modulating the duty cycle of the voltages used to charge the inductive component. Common types of magnetic storage DC-DC converters include buck and boost converters.

At least one challenge associated with boost and buck converters are reduced efficiency at high switching frequencies, as well as higher power loss. A typical arrangement for a DC-DC power switching converter is to use a cascaded unregulated full bridge and multiple post buck converters, as discussed in U.S. Pat. No. 7,072,190 to Schlecht. This type of converters cannot have a wide output voltage range because the key voltage rating of the power components is very high which results in a low efficiency.

SUMMARY OF THE INVENTION

A switching power converter is presented which overcomes the problems noted above. A voltage source provides an input voltage Vin to an unregulated DC/DC converter stage. The unregulated DC/DC converter stage is arranged to produce an output bus voltage in response to the received input voltage Vin. At least one buck-boost converter stage is arranged to receive the output bus voltage from the unregulated DC/DC converter stage and produces an output voltage Vout. The at least one buck-boost converter stage preferably also comprises a mode selection module which is arranged to configure the at least one buck-boost converter stage to operate in either a buck, boost or buck-boost mode.

In one embodiment of the invention, the at least one buck-boost converter stage can be arranged to comprise an inductor, a capacitor and a plurality of switching devices, wherein the switching power converter is arranged to operate the switches to produce a desired output voltage Vout across the output capacitor.

These and other features, aspects and advantages of the present invention will become better understood with reference to the following description and claims.

BRIEF DESCRIPTION OF THE DRAWINGS

FIG. 2b is a timing diagram for the switching power converter of FIG. 2a.

FIG. 2c is a timing diagram for the switching power converter of FIG. 2a.

FIG. 2d is a timing diagram for the switching power converter of FIG. 2a.

FIG. 2e is a timing diagram for the switching power converter of FIG. 2a.

DETAILED DESCRIPTION OF THE INVENTION

Embodiments of the invention provide a switching power converter that utilizes a cascaded unregulated DC/DC converter stage and a regulated buck-boost converter stage to provide a wide output voltage range.

Figure 1A:
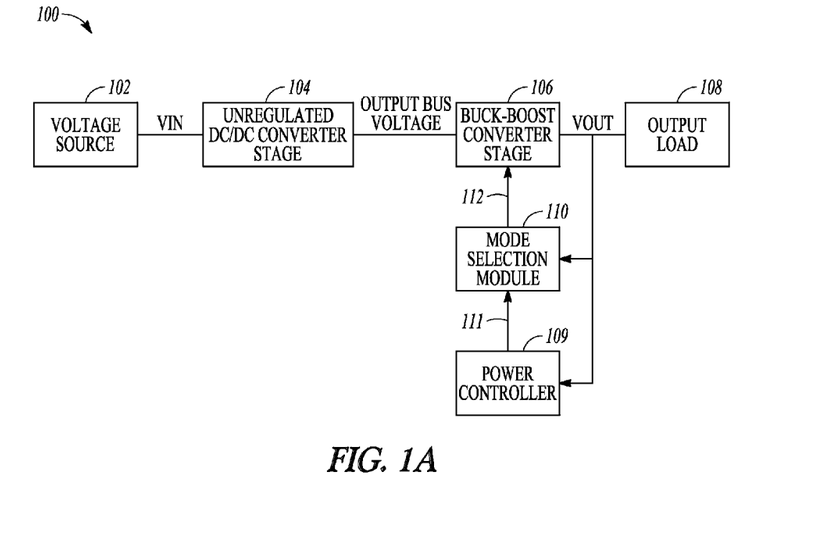
FIG. 1a is a block diagram of a switching power converter according to an embodiment of the invention.

FIG. 1a shows a block diagram of a switching power converter 100 according to an embodiment of the invention. A voltage source 102 provides an input voltage Vin that is fed into an unregulated DC/DC converter stage 104. The unregulated DC/DC converter stage 104 is adapted to be connected to a buck-boost converter stage 106. The buck-boost converter stage 106 receives an output bus voltage from the unregulated DC/DC converter stage 104 in order to produce a desired output voltage Vout at an output load 108.

The unregulated DC/DC converter stage 104 receives the input voltage Vin and is arranged to produce the output bus voltage, which is isolated from the input voltage Vin, typically with a transformer.

The buck-boost converter stage 106 comprises at least one switching element which is adapted to be switched on and off in response to a mode selection signal 112 from a mode selection module 110 to provide the desired output voltage Vout. The buck-boost converter stage 106 is governed by the mode selection module 110 such that the buck-boost converter stage 106 operates in a buck mode, boost mode, or buck-boost mode to produce the desired output voltage Vout. At least one advantage of the invention is that the switching power converter can provide an ultra wide range of isolated output voltages, which are due in part to the buck-boost converter stage adapted to operate in buck mode, boost mode, or buck-boost mode. This allows the invention to provide different output voltage levels depending on the load requirements.

Figure 1B:
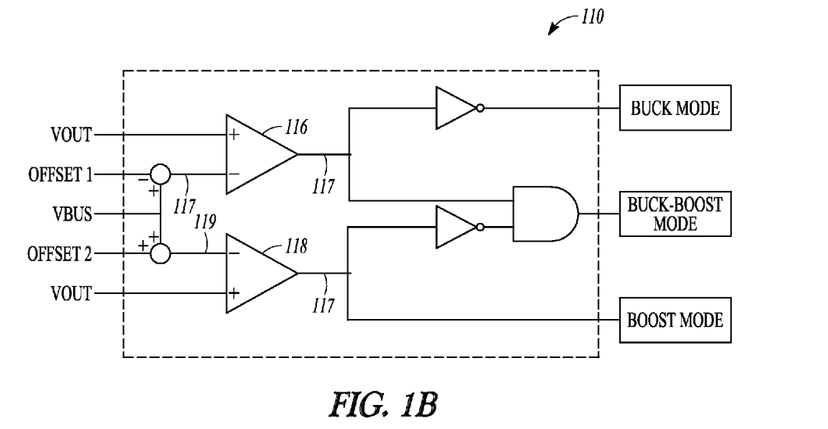
FIG. 1b is a circuit diagram of a mode selection module according to an embodiment of the invention.

FIG. 1b shows an embodiment of a mode selection module 110 that can be used in conjunction with any of the switching power converters discussed herein. In one embodiment of the invention, the mode selection module 110 is configured to receive a plurality of input signals in order to determine which mode the buck-boost converter stage 106 should operate in. The mode selection module 110 receives the output voltage bus as an input signal 113 and the output voltage Vout as another input signal 115. The output voltage Vout is compared with two threshold signals 117, 119 using a first comparator 116 and a second comparator 118, and generates two intermediate selection signals 120, 122 which are used to determine whether the buck-boost converter stage 106 operates in buck mode, boost mode or buck-boost mode. The first threshold signal 117 is generated by the output bus voltage plus a negative offset, while the second threshold signal 119 is generated by the output bus voltage plus a positive offset. The two intermediate selection signals 120, 122 determine which mode the buck-boost converter stage 106 will operate in, preferably using logic gates. The value of the offsets can be programmable, such that the value of the offsets can be increased or decreased in order to adjust and/or improve performance.

When the output voltage Vout is less than the first threshold signal 117, first comparator 116 outputs first intermediate selection signal 120 having a low state value, thereby instructing the buck-boost converter stage 106 to operate in buck mode. This is due to the low value or zero (0) of the first threshold signal 120 being inverted to a high value or one (1) by an inverter. When the output voltage Vout is higher than the first threshold signal 117 but lower than the second threshold signal 119, the first comparator 116 outputs first intermediate selection signal 120 having a high state value and the second comparator 118 outputs second intermediate selection signal 122 having a low state value, thereby instructing the buck-boost converter stage 106 to operate in buck-boost mode. The low state value of the signal 122 is inverted by an inverter which changes the signal 122 to a high state value. The high value or one (1) of the signal 120 and the high value of signal 122 are inputted into an AND gate which outputs high value, and activates the buck-boost mode. When the output voltage Vout is higher than the second threshold signal 119, the second comparator 118 outputs second intermediate selection signal 122 having a high state value, thereby instructing the buck-boost converter stage 106 to operate in boost mode.

Figure 1C:
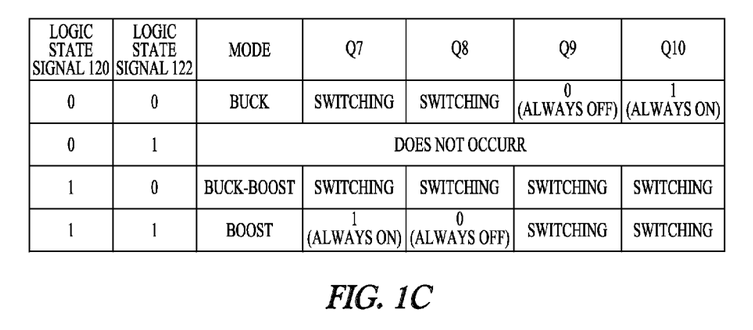
FIG. 1c is a truth table for the mode selection module of FIG. 1b.

FIG. 1c provides a truth table for the mode selection module 110. When intermediate signals 120 and 122 have a logic state of low or zero (0), the mode selection module 110 instructs the buck-boost converter stage 106 to operate in buck mode, wherein switch Q7 and Q8 operate in complementary fashion, while switch Q9 is off and Q10 is on for the duration of the buck-boost converter stage 106 operating in buck mode. When intermediate signal 120 has a logic state of high or one (1) and signal 122 has a logic state of low or zero (0), the mode selection module 110 instructs the buck-boost converter stage 106 to operate in buck-boost mode, wherein switches Q7, Q8 are paired to operate in complementary switching fashion and switches Q9, Q10 are paired to operate in complementary switching fashion. In this embodiment, switches Q7 and Q9 are in phase and switches Q8 and Q10 are in phase. When intermediate signals 120, 122 both have a logic state of high or one (1), the mode selection module 110 instructs the buck-boost converter stage 106 to operate in boost mode, wherein switches Q9 and Q10 operate in complementary switching fashion, while switch Q7 is on and Q8 is off for the duration of the buck-boost converter stage 106 operating in boost mode.

The mode selection module 110 also receives a controller signal 111 from a controller 109. The controller 109 generates the controller signal 111, which in one embodiment is or more pulse width modulation (PWM) signals, which are used to control the buck-boost converter stage 106 in order to generate the desired output voltage Vout. The controller 109 senses the output voltage Vout through a feedback control loop. The controller 109 adjusts the controller signal 111 as needed, based on the output voltage Vout received through the feedback control loop. The controller signal 111 can be any type of signal known in the art and the invention is not intended to be limited to one or more PWM signals.

Figure 1D:
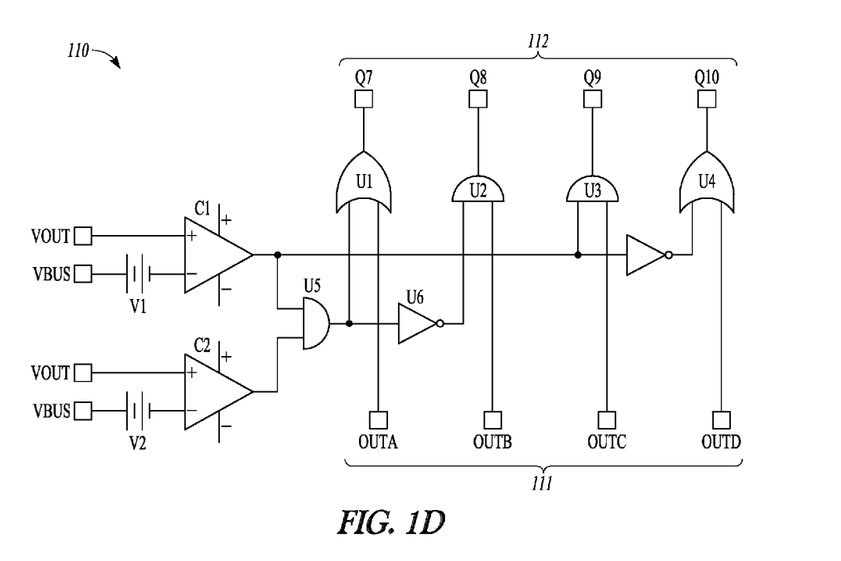
FIG. 1d is a circuit diagram of a mode selection module according to an embodiment of the invention

The truth table shown in FIG. 1c can be realized in a number of ways; one possible embodiment is shown in FIG. 1d. Here, the truth table is realized using logic gates U1-U7 and comparators C1 and C2, wherein V1 acts as a negative offset and V2 acts as a positive offset similarly as discussed for the embodiment of FIG. 1b. The embodiment of FIG. 1d allows the controller signal 111 to be delivered to switches Q7-Q10 in accordance with the truth table. In other embodiments the mode selection module can be implemented by software coding.

The embodiment of FIG. 1b is an example as to how the buck-boost converter stage 106 receives instructions as to which mode to operate in. The mode selection module 110 can be configured in many different ways and is not intended to be limited to the embodiments disclosed herein. For example, the mode selection module 110 can be implemented using hardware circuitry, or with software stored in memory and executed by a processor.

Figure 2A:
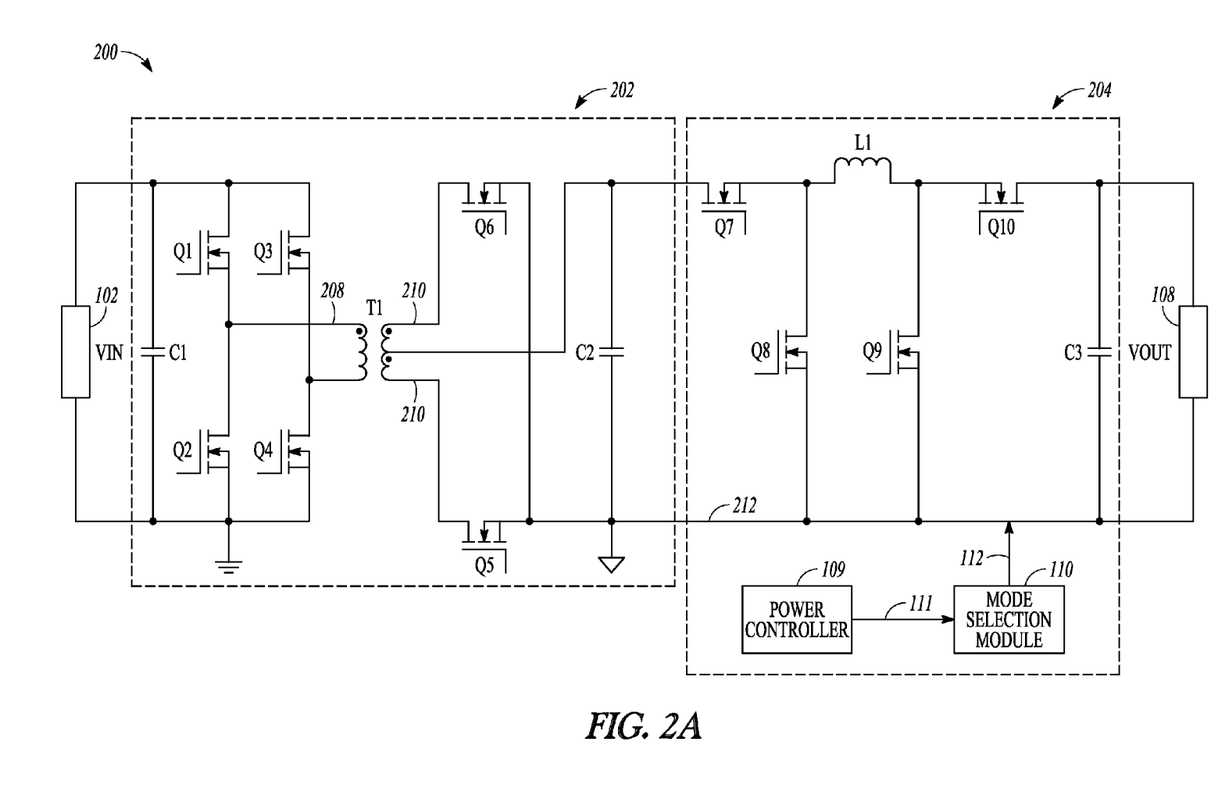
FIG. 2a is a circuit diagram of a switching power converter according to an embodiment of the invention.

FIG. 2a shows a switching power converter 200 according to an embodiment of the invention. FIG. 2a is meant to convey one embodiment of the general system of FIG. 1a, such that the discussion below details the operation of the switching power converter 200 with reference to one possible exemplary embodiment. Thus, it is understood that other embodiments according to the claims are possible. In one embodiment of the invention, the switching power converter 200 comprises a voltage source 102 that provides an input voltage Vin that is fed into an unregulated DC/DC converter stage 202, whereby the unregulated DC/DC converter stage 202 provides an output bus voltage 206 to a regulated buck-boost converter stage 204. Operation of the buck-boost converter stage 204 is governed by the mode selection module 110 and the power controller 109, such that the mode selection module 110 instructs the buck-boost converter stage 204 to operate in buck mode, boost mode, or buck-boost mode and the power controller 109 drives the buck-boost converter stage 204 to produce the desired output voltage Vout at an output load 108.

In the embodiment shown in FIG. 2a, the unregulated DC/DC converter stage 202 is a full bridge converter with synchronous rectification and is comprised of a transformer T1, capacitors C1 and C2, and switches Q1-Q6. Switches Q1-Q4 form the full bridge and are coupled between the voltage source 102 and the transformer T1, while switches Q5 and Q6 are coupled between transformer T1 and capacitor C2. Transformer T1 has a turn ratio of n, a primary winding 208 and two secondary windings 210. One end of the primary winding 208 is coupled to the node between switches Q1 and Q2 and the other end of the primary winding is coupled to the node between switches Q3 and Q4. Switches Q5 and Q6 are coupled to a respective one of the secondary windings 210 and the buck-boost converter stage 204, with the respective drains of switches Q5 and Q6 connected to a respective secondary winding 210 and the respective sources of the switches Q5 and Q6 connected to a circuit common point. Switches Q5, Q6 and secondary windings 210 are arranged such that they operate as synchronous rectifiers. Transformer T1 is shown in FIG. 2a as a center-tapped transformer; however, in other embodiments, transformer T1 can be configured in many different ways and is not intended to be limited to a center-tapped transformer.

Figure 2B:
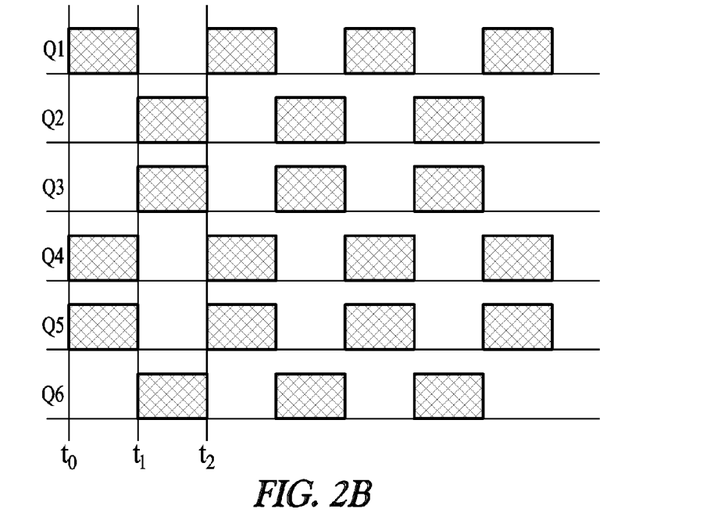

FIG. 2b is a timing diagram which illustrates the operation of the unregulated DC/DC converter stage 202 of FIG. 2a. In one embodiment of the invention, switches Q1-Q6 of the unregulated DC/DC converter stage 202 operate in a fixed 50% duty cycle. However, in other embodiments, the duty cycle of the switches Q1-Q6 can be more or less than 50%. While in yet other embodiments, the duty cycle of the switches Q1-Q6 can be the same or different. At time $t_0$ to $t_1$, switches Q1, Q4, and Q5 are on, while switches Q2, Q3 and Q6 are off. The energy from the voltage source 102 is transferred across the transformer T1 to capacitor C2, where it is stored. The output bus voltage at capacitor C2 is isolated from the input voltage Vin. At time t1 to t2, switches Q2, Q3 and Q6 are on, while switches Q1, Q4 and Q5 are off. Energy is again transferred across the transformer T1, in a symmetrical manner, to further charge capacitor C2. The output bus voltage at capacitor C2 is proportional to the input voltage Vin by a factor that varies with the turn ratio n of transformer T1.

Referring back to FIG. 2a, the buck-boost converter stage 204 is configured to receive the output bus voltage from the unregulated DC/DC converter stage 202 to form the desired output voltage Vout. In one embodiment of the invention, the buck-boost converter stage 204 comprises an inductor L1, a capacitor C3, and at least one switch adapted to be activated and deactivated over a period of time to produce the desired output voltage Vout. The embodiment of the buck-boost converter stage 204 in FIG. 2a is arranged to comprise switches Q7-Q10 with switch Q7 connected between the input to the buck-boost converter stage 202 and a first end of inductor L1. Switch Q8 is connected between a first end of inductor L1 and a circuit common point 212, switch Q9 is connected between a second end of L1 and the circuit common point, and switch Q10 is connected between the second end of L1 and capacitor C3. Switches Q7-Q10 are activated and/or deactivated in response to the mode selection signal 112 from the mode selection module 110 in order to produce the desired output voltage Vout. Switches Q7-Q10 are shown as being MOSFETs, but the invention is not intended to be limited to MOSFETs; other elements known in the art, such as but not limited to IGBPs, can be utilized.

Figure 2C:
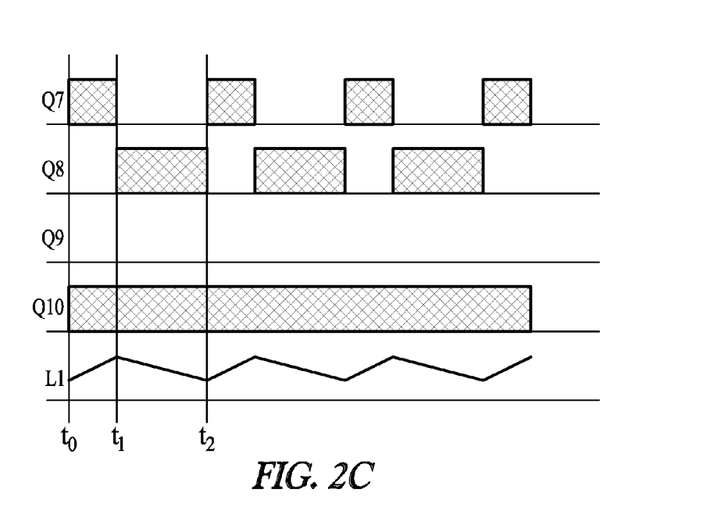

FIG. 2c shows a timing diagram which illustrates the operation of the buck-boost converter stage 204 of FIG. 2a. The buck-boost converter stage 204 can operate in a buck mode, a boost mode, or a buck-boost mode. The following is a discussion of the buck-boost converter stage 204 operating in buck mode. Upon receipt of instructions from the mode selection module 110 to operate in buck mode, switch Q9 is deactivated and switch Q10 is activated; Q9 and Q10 remain in their respective states for the duration of the time that converter stage 204 operates in buck mode. Switches Q7 and Q8 operate in complementary fashion, such that when switch Q7 is activated, switch Q8 is deactivated and vice versa. A switch which is activated conducts current, while a switch which is deactivated does not.

During buck mode operation, switch Q7 and Q8 and inductor L1 function as a buck converter. As shown in FIG. 2c, during time $t_0$ to $t_1$, switch Q7 is activated and switch Q8 is deactivated. The voltage across inductor L1 is Vin/(n−Vout); the inductor current of inductor L1 increases linearly. During time $t_1$ to $t_2$, switch Q7 is deactivated and switch Q8 is activated. The voltage across inductor L1 is −Vout, while the inductor current of inductor L1 decreases linearly. The switching frequency of the buck-boost converter stage 204 while in buck mode, boost mode and/or buck-boost mode, can be independent of that of the DC/DC converter stage 202. The output voltage Vout, in buck mode operation, is Vout=Vin*D/n, where D is the duty cycle and n is the turns ratio of transformer T1.

Figure 2D:
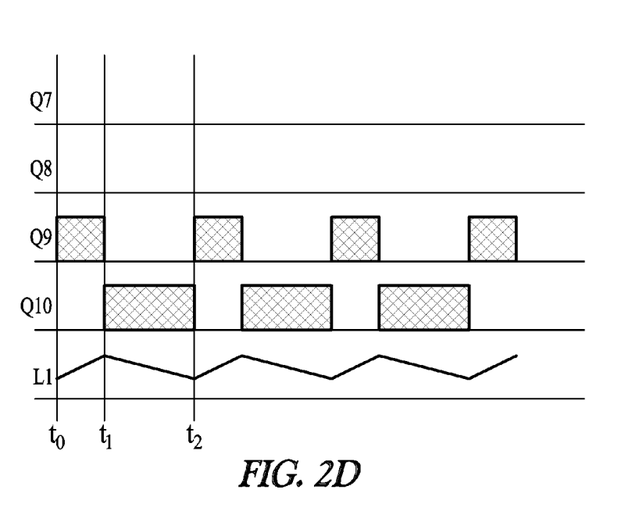

FIG. 2d shows a timing diagram which illustrates the operation of the buck-boost converter stage 204 while operating in boost mode. Upon receipt of instructions from the mode selection module 110 to operate in boost mode, switch Q7 is activated and switch Q8 is deactivated; Q7 and Q8 remain in their respective states for the duration of the time that converter stage 204 operates in boost mode. Switches Q9 and Q10 operate in complementary fashion, such that when switch Q9 is activated, switch Q10 is deactivated and vice versa. During boost mode operation, switch Q9 and Q10 and inductor L1 function as the boost converter. As shown in FIG. 2d, during time $t_0$ to $t_1$, switch Q9 is activated and switch Q10 is deactivated. The voltage across inductor L1 is equal to Vin and the inductor current of inductor L1 increases linearly. During time $t_1$ to $t_2$, switch Q9 is deactivated and switch Q10 is activated. The voltage across inductor L1 is Vin/n-Vout, while the inductor current of inductor L1 is decreased linearly. The output voltage Vout, in boost mode operation, is Vout=Vin/(n*(1−D)), where D is the duty cycle of switch Q7 and n is the turns ratio of transformer T1.

Figure 2E:
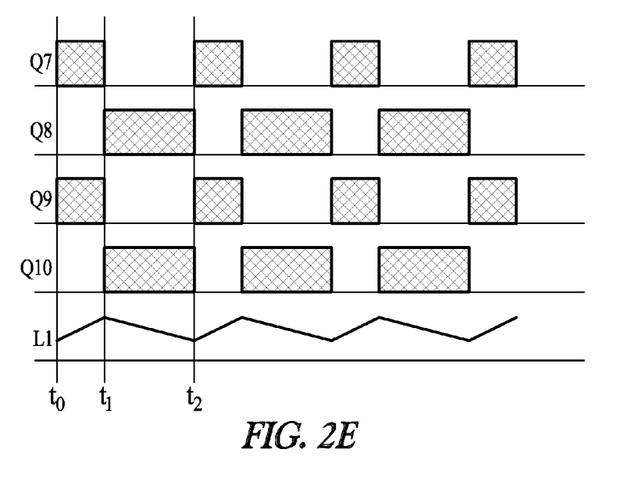
Figure 3:
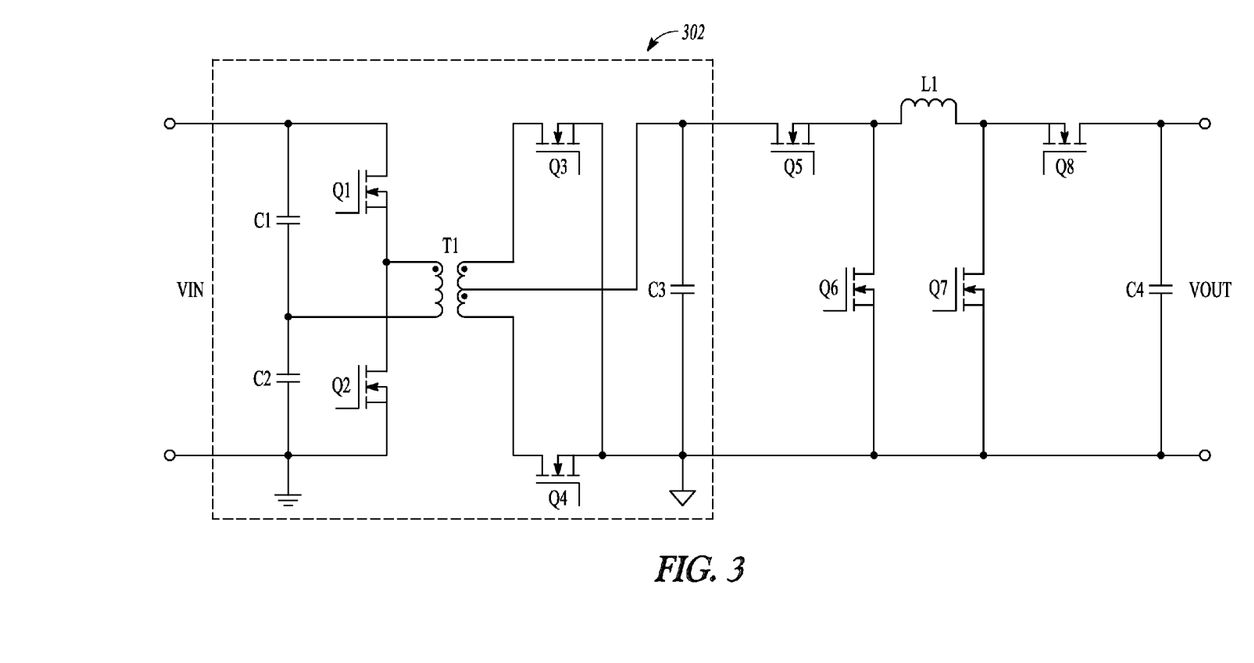
FIG. 3 is a circuit diagram of a switching power converter according to an embodiment of the invention.

FIG. 2e shows a timing diagram which illustrates the operation of the buck-boost converter stage 204 while operating in buck-boost mode. Upon receipt of instructions from the mode selection module 110 to operate in buck-boost mode, switches Q7 and Q9 are paired to operate in synchronous switching mode and switches Q8 and Q10 are paired to operate in synchronous switching mode. The first pair of switches Q7/Q9 and the second pair of switches Q8/Q10 operate in complementary fashion, such that when the first pair of switches are activated, the second pair of switches are deactivated and vice versa. During time $t_o$ to $t_1$, the first pair of switches Q7/Q9 are activated and the second pair of switches Q8/Q10 are deactivated. During this time, the voltage across inductor L1 is Vin/n and the inductor current of inductor L1 increases linearly, which results in a delta inductor current of $\Delta i_{inc}$=(Vin/n)*T*D/L1$n$ where T is the period of the switching cycle while in buck-boost mode, n is the turns ratio of transformer T1, and D is the duty cycle of switch Q7. During time $t_1$ to $t_2$, the second pair of switches Q8/Q10 are activated and the first pair of switches Q7/Q9 are deactivated. During this time, the voltage across L1 is −Vout and the inductor current of L1 decreases linearly, which results in a delta inductor current of $\Delta i_{dec}$Vout*(T−T*D)/L1. Since the delta inductor current while the current of the inductor increases is equal to the delta inductor current when the current of the inductor decreases, $\Delta i_{inc}$=$\Delta i_{inc}$=$\Delta i_{dec}$ the output voltage Vout while in buck-boost mode is Vout=(Vin/n)*(D/(1−D)), where D is the duty cycle of switch Q7. If D<0.5, the output voltage Vout is less than the input voltage Vin and the buck-boost converter stage 204 operates as a buck converter. If D>0.5, the output voltage Vout is greater than the input voltage Vin and the buck-boost converter stage 204 operates as a boost converter.

Figure 4:
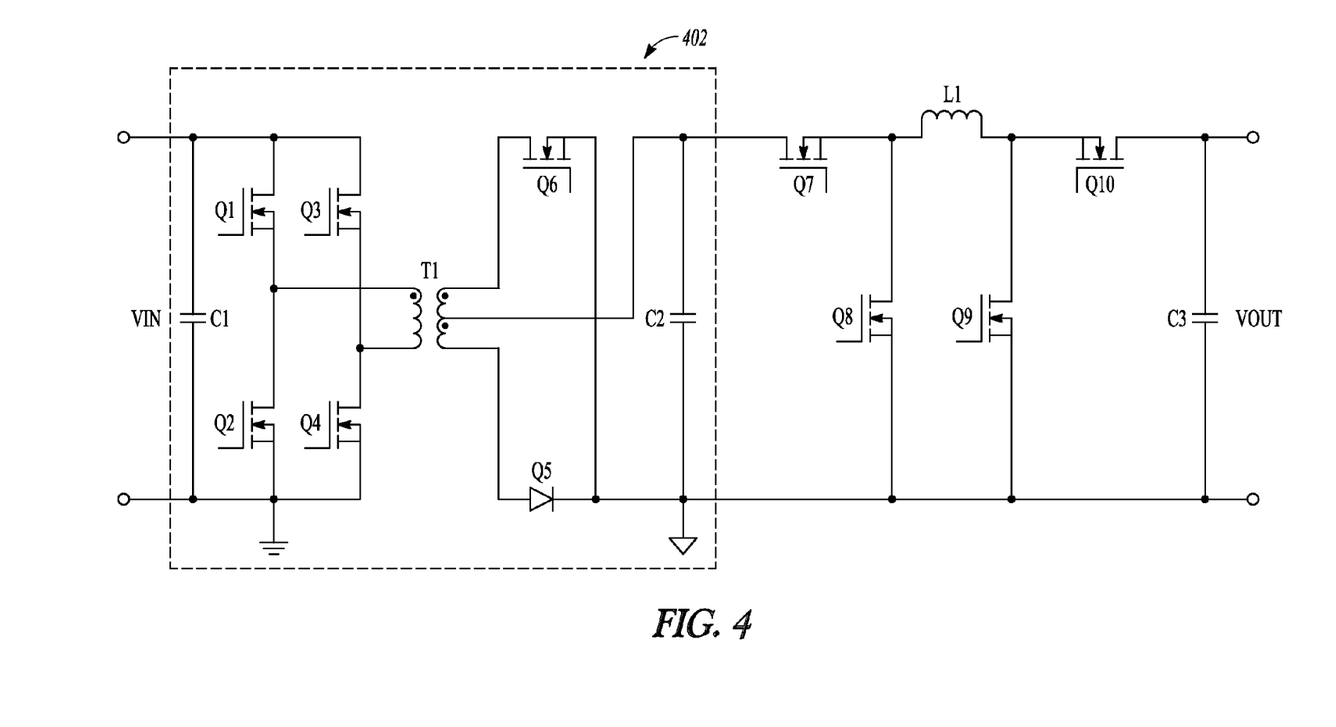
FIG. 4 is a circuit diagram of a switching power converter according to an embodiment of the invention.
Figure 5:
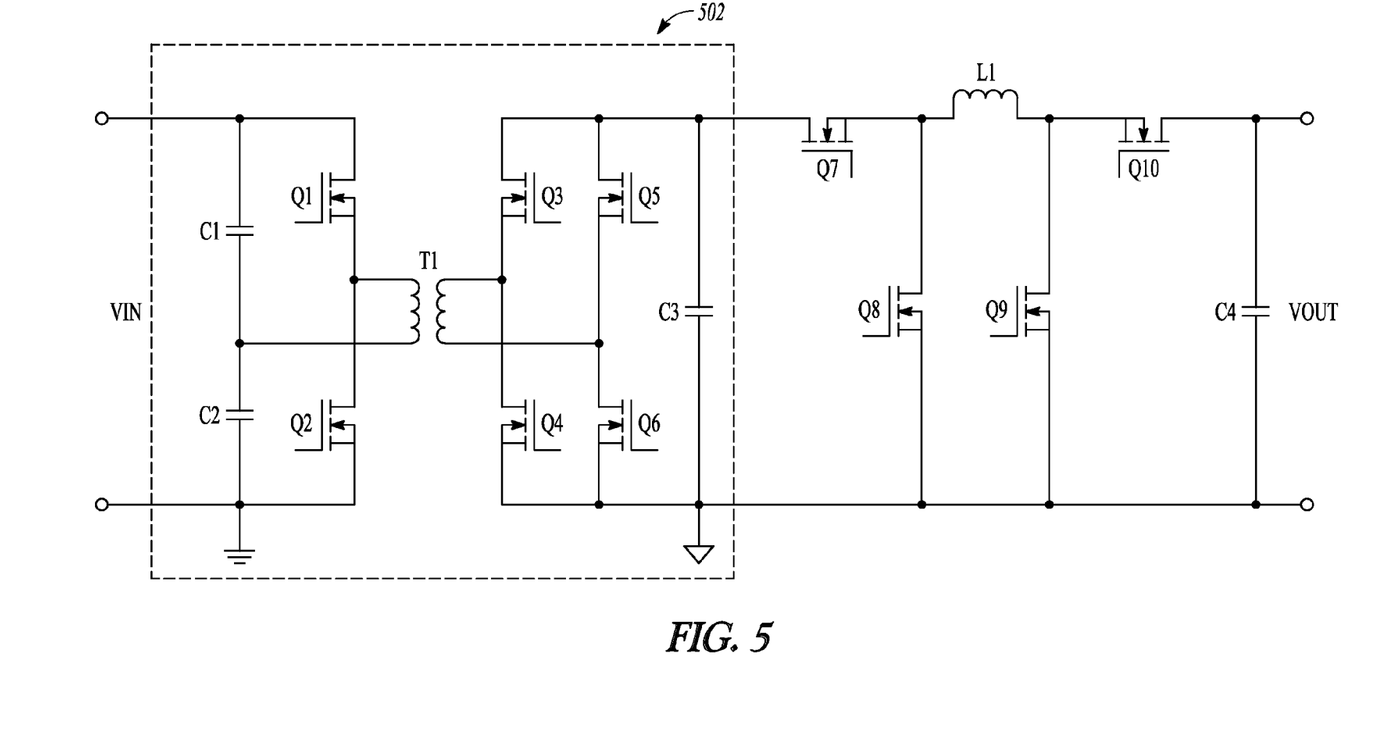
FIG. 5 is a circuit diagram of a switching power converter according to an embodiment of the invention.
Figure 6:
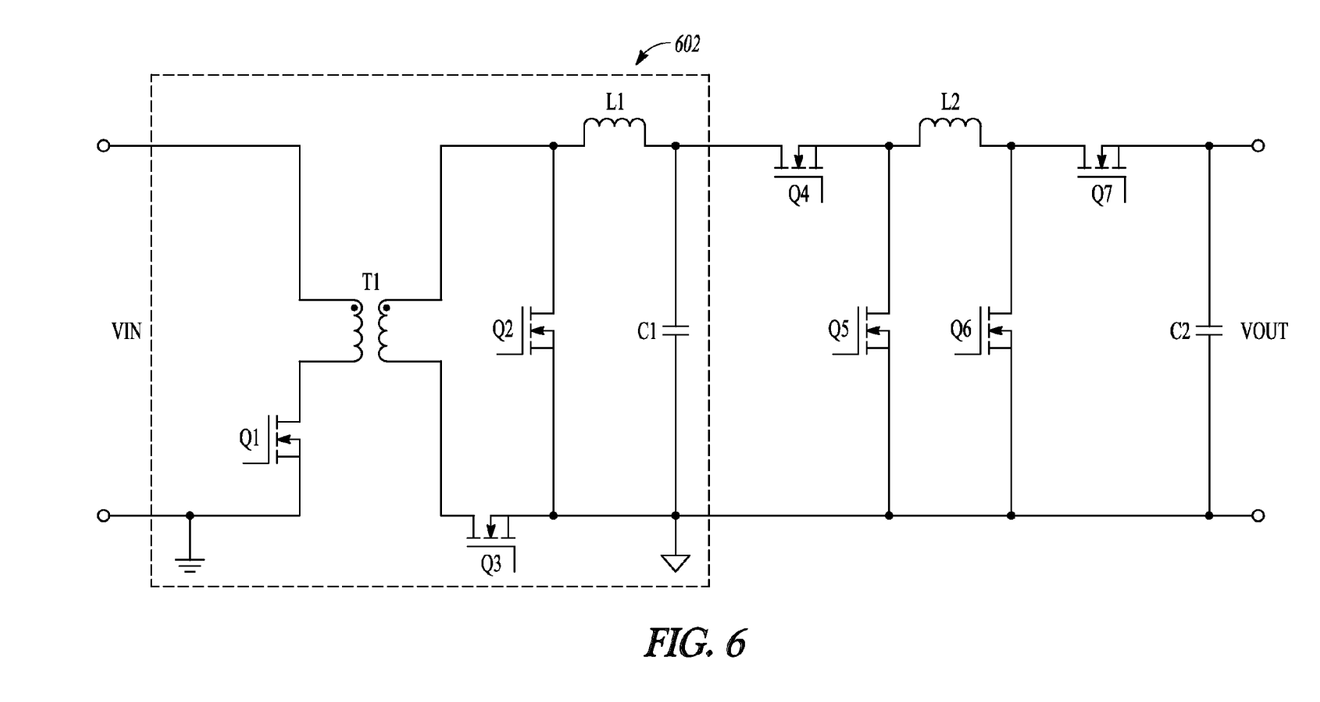
FIG. 6 is a circuit diagram of a switching power converter according to an embodiment of the invention.
Figure 7:
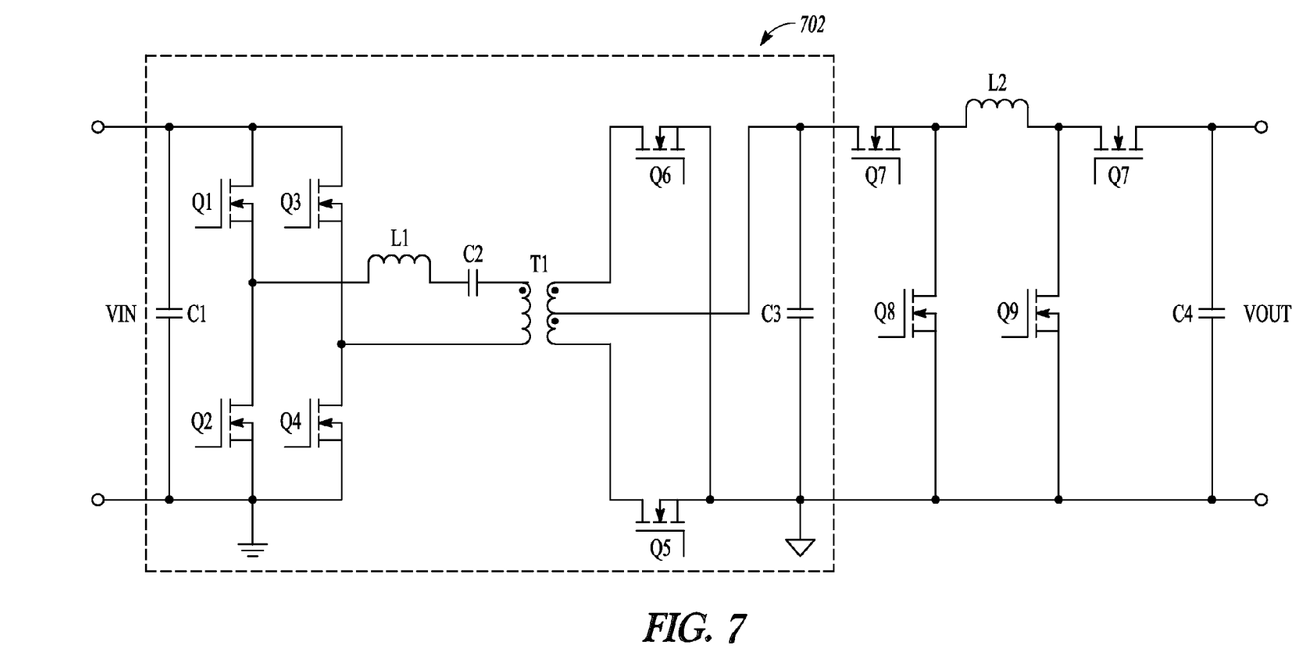
FIG. 7 is a circuit diagram of a switching power converter according to an embodiment of the invention.

It must be noted that the circuits illustrated herein are merely exemplary. The order of the circuit elements in the switching power converter can be modified and still achieve the same result. It should be also noted that there may be additional circuits in the switching power converter in addition to those discussed herein. The unregulated DC/DC converter stage can be arranged in many different configurations and is not intended to be limited to a full bridge converter with synchronous rectification, as shown in FIG. 2a. In other embodiments, such as that shown in FIG. 3, the unregulated DC/DC converter stage 302 can be configured to comprise a half bridge topology with full wave synchronous rectification. FIG. 4 discloses yet another embodiment of the invention, wherein the unregulated DC/DC converter stage 402 is configured to comprise a full bridge topology with full wave diode rectification. FIG. 5 discloses an embodiment wherein an unregulated DC/DC converter stage 502 is configured to comprise a half bridge and full bridge rectification. FIG. 6 discloses an embodiment wherein an unregulated DC/DC converter stage 602 is configured in a forward topology. FIG. 7 discloses an embodiment wherein an unregulated DC/DC converter stage 702 is configured to be a resonant unregulated DC/DC converter. The embodiments shown in FIGS. 3-7 can each comprise a buck-boost converter stage similar to the buck-boost converter stage 204 shown in FIG. 2a. In the embodiments of FIGS. 3-7, the buck-boost converter stage comprises a mode selection module and a power controller similar to the mode selection module 110 and the power controller 109, but were not shown for ease of the drawings.

In yet another embodiment, the unregulated DC/DC converter stage can be arranged to be comprised of a push-pull circuit or flyback circuit instead of a transformer based circuit. In another embodiment, the unregulated DC/DC converter stage can be arranged to comprise a current doubler rectifier arranged as a diode rectifier, a synchronous rectifier or a combination thereof. The switching power converter can be arranged in many different ways using any combination of the elements disclosed herein and is not intended to be limited to the specific embodiments disclosed herein.

Figure 8:
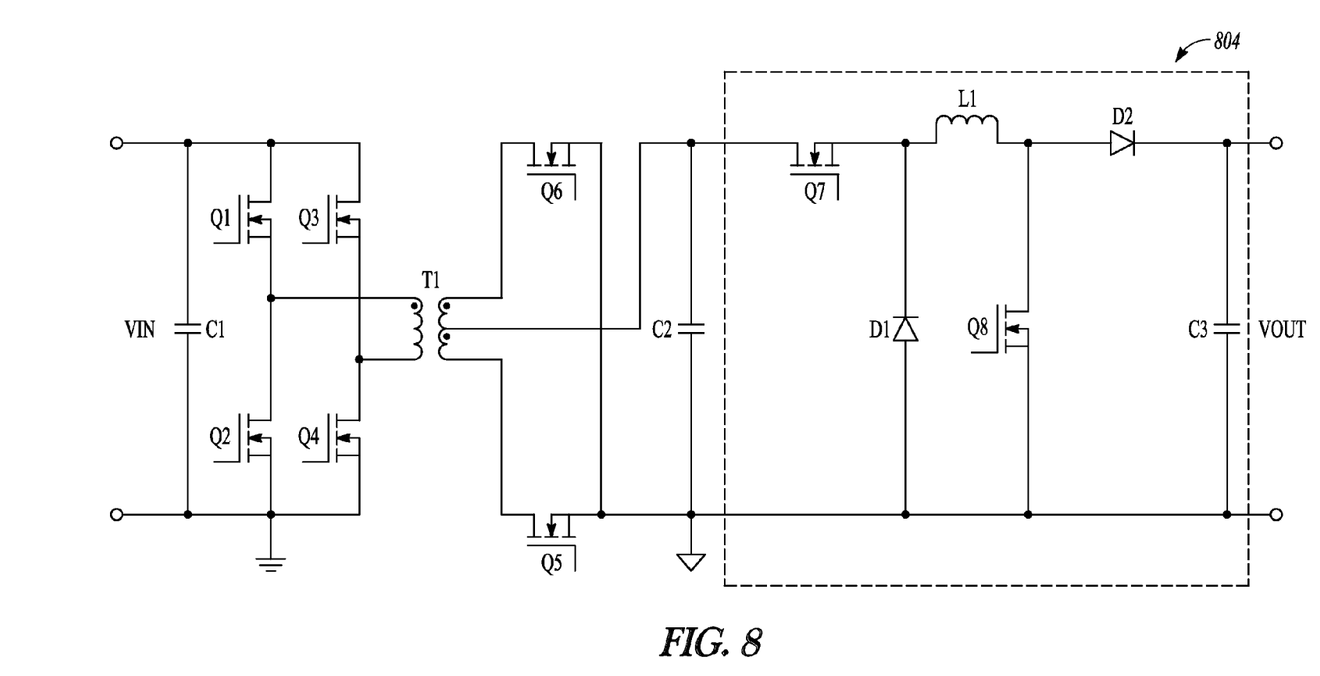
FIG. 8 is a circuit diagram of a switching power converter according to an embodiment of the invention.
Figure 9:
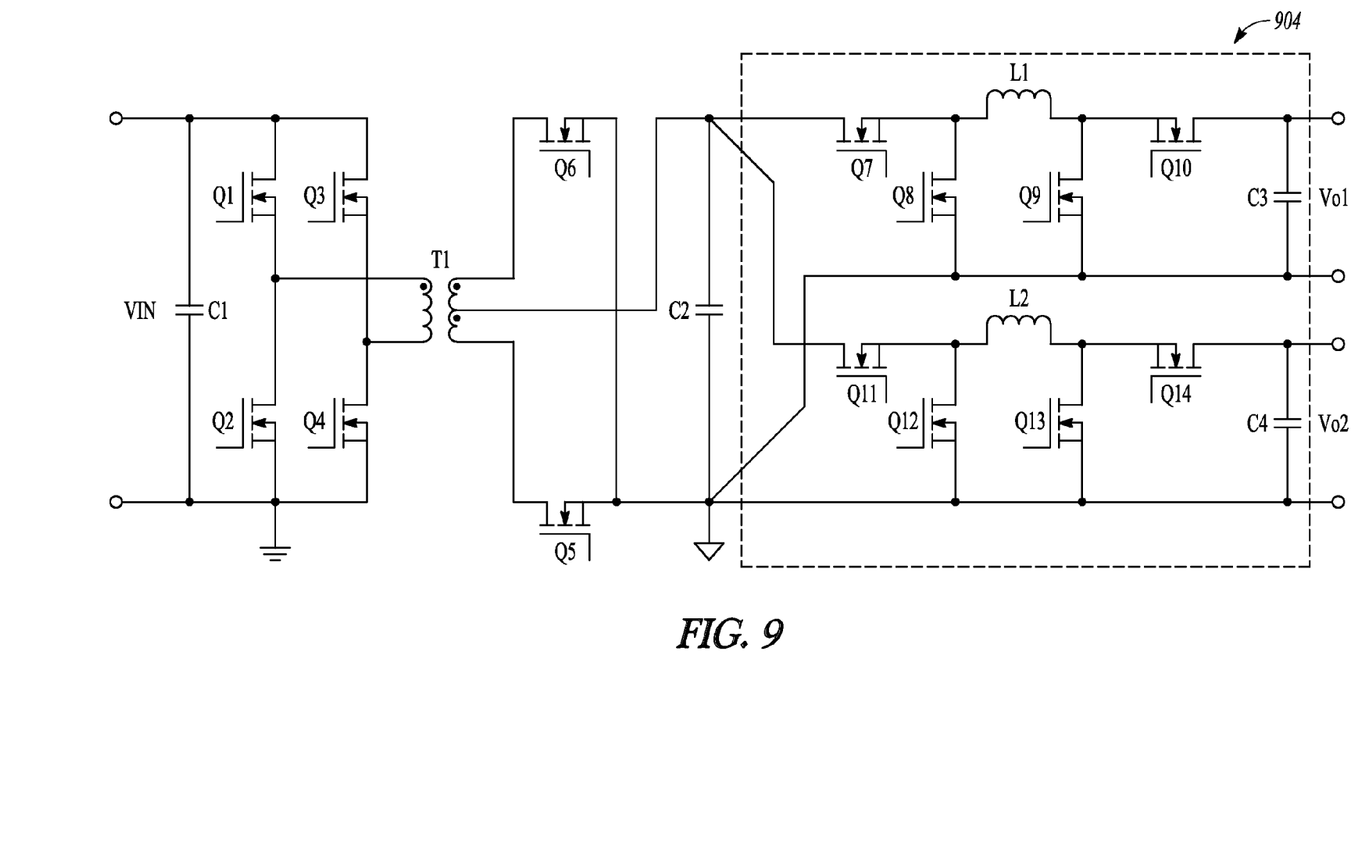
FIG. 9 is a circuit diagram of a switching power converter according to an embodiment of the invention.
Figure 10:
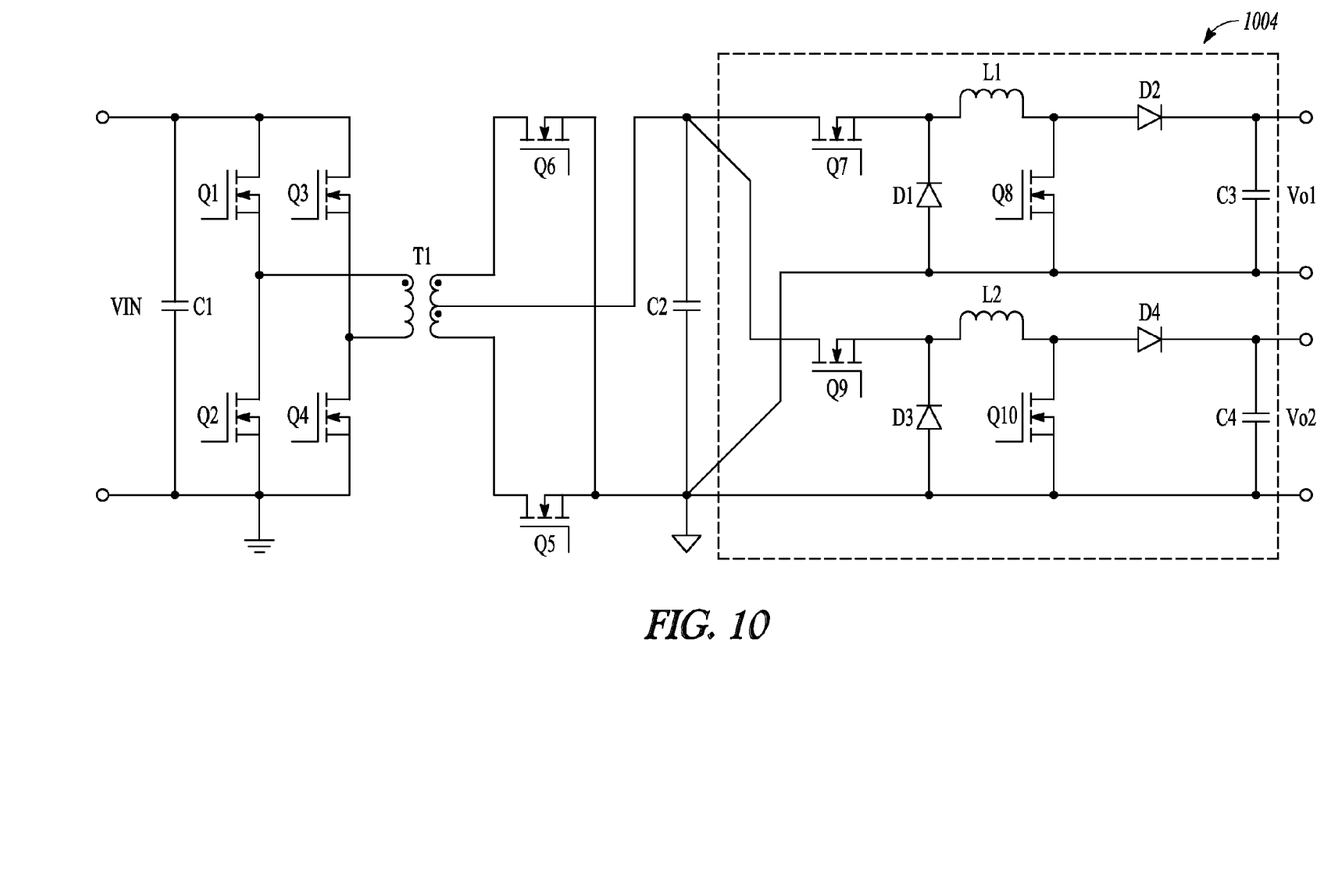
FIG. 10 is a circuit diagram of a switching power converter according to an embodiment of the invention.

The buck-boost converter stage can also be arranged in many different configurations, and is not intended to be limited to the buck-boost converter stage 204 shown in FIG. 2a. In other embodiments, such as shown in FIG. 8, a buck-boost converter stage 804 can be configured to comprise a buck-boost converter having freewheeling diodes. FIG. 9 shows another embodiment wherein a buck-boost converter stage 904 is comprised of a plurality of buck-boost converters. Each of the buck-boost converters of the buck-boost converter stage 904 are arranged to operate similarly to the buck-boost converter of buck-boost converter stage 204 shown in FIG. 2a, but each converter stage 904 can be operated in either buck, boost or buck-boost mode, and arrange to produce its own independent output voltage. FIG. 10 shows another embodiment wherein a buck-boost converter stage 1004 is comprised of a plurality of buck-boost converters having freewheeling diodes, similar to the buck-boost converter stage 804 of FIG. 8. An advantage of the invention is that the switching power converter can be adapted to provide a plurality of output voltages, while only using one unregulated DC/DC converter stage to provide a voltage to each of the plurality of buck-boost converter stages. Yet another advantage of the invention is that the size of the switching power converter has been optimized to have a reduced size, especially in embodiments wherein the switching power converter is arranged to comprise a plurality of buck-boost converter stages. In the embodiments of FIGS. 8-10, each buck-boost converter stage comprises a respective mode selection module and power controller, similar to the mode selection module 110 and the power controller 109, but were not shown for ease of the drawings.

While particular embodiments of the invention have been shown and described, numerous variations and alternate embodiments will occur to those skilled in the art. Accordingly, it is intended that the invention be limited only in terms of the appended claims.

We claim:
1. A switching power converter, comprising:
an unregulated DC/DC converter stage which receives an input voltage Vin and produces an output bus voltage; at least one configurable buck-boost converter stage which receives the DC/DC converter output bus voltage and produces an output voltage Vout; and at least one mode selection module arranged to configure said buck-boost converter stage to operate in a buck, boost or buck-boost mode,
wherein said configurable buck-boost converter stage comprises: an inductor; a capacitor; a first switch connected between an input to said buck-boost converter and the first end of said inductor; a second switch connected between a first end of said inductor and a circuit common point; a third switch connected between the second end of said inductor and said circuit common point; and a fourth switch connected between the second end of said inductor and said capacitor; said switching power converter arranged to operate said switches in any of a buck converter mode, a boost converter mode, and a buck-boost converter mode to produce a desired output voltage Vout across said capacitor,
wherein said mode selection module comprises:
a first comparator circuit including first and second inputs and a first comparator output, wherein the first input is electrically coupled to the output voltage and the second input is electrically coupled to a voltage having a negative offset from the output bus voltage;
a second comparator circuit including first and second inputs and a second comparator output, wherein the first input is electrically coupled to the output voltage and the second input is electrically coupled to a voltage having positive offset from the output bus voltage;
a first AND gate circuit having first and second inputs and a first AND gate output, wherein the first input is electrically coupled to the first comparator output and the second input is electrically coupled to the second comparator output;
a first OR gate circuit having first and second inputs and a first OR gate output, wherein the first input is electrically coupled to the first AND gate output, the second input receives a first control signal and the first OR gate output is electrically coupled to the first switch;
a second AND gate circuit including first and second inputs and a second AND gate output, wherein the first input receives an inverted signal of the first AND gate output, the second input receives a second control signal, and the second AND gate output is electrically connected to the second switch;
a third AND gate circuit including first and second inputs and a third AND gate output, wherein the first input is electrically coupled to the first comparator output, the second input receives a third control signal, and the third AND gate output is electrically coupled to the third switch; and
a second OR gate circuit including first and second inputs and a second OR gate output, wherein the first input receives an inverted signal of the first comparator output, the second input receives a fourth control signal, and the second OR gate output is electrically coupled to the fourth switch.

2. The switching power converter of claim 1, wherein said unregulated DC/DC converter can be arranged in a full bridge, half bridge, or push pull topology.

3. The switching power converter of claim 1, wherein said unregulated DC/DC converter can be arranged as a full wave rectifier, full bridge rectifier, or current doubler rectifier.

4. The switching power converter of claim 3, wherein said rectifier can be arranged as a diode rectifier, synchronous rectifier, or a combination thereof.

5. The switching power converter of claim 4, wherein said synchronous rectifier is a MOSFET or IGBT.

6. The switching power converter of claim 1, wherein said unregulated DC/DC converter can be arranged in a forward topology or flyback topology.

7. The switching power converter of claim 1, wherein said unregulated DC/DC converter is arranged to operate with a fixed 50% duty cycle.

8. The switching power converter of claim 1, wherein said unregulated DC/DC converter further comprises a transformer having a turns ratio n.

9. The switching power converter of claim 1, wherein the first, second, third, and fourth control signals are pulse width modulation signals.

10. The switching power converter of claim 8, wherein said buck-boost converter stage is arranged to operate in a buck mode during which said third switch is off, said fourth switch is on, and said first and second switches are operated in complementary fashion during a switching cycle such that said output voltage $Vout=Vin*D/n$, wherein D is the duty cycle of said first switch.

11. The switching power converter of claim 8, wherein said buck-boost converter stage is arranged to operate in a boost mode during which said first switch is on, said second switch is off, and said third and fourth switches are operated in complementary fashion during a switching cycle such that said output voltage $Vout=Vin/(n*(1-D))$, wherein D is the duty cycle of said third switch.

12. The switching power converter of claim 8, wherein said buck-boost converter stage is arranged to operate in a buck-boost mode during which said first and second switches are operated in complementary fashion during a switching cycle and said third and fourth switches are operated synchronously with said first and second switches, respectively, during said switching cycle, such that said output voltage $Vout=(Vin/n)*D/(1-D)$, wherein D is the duty cycle of said first and third switches.

13. The switching power converter of claim 12, wherein said buck-boost converter stage is a buck converter when $D<0.5$.

14. The switching power converter of claim 12, wherein said buck-boost converter stage is a boost converter when $D>0.5$.

15. The switching power converter of claim 1, wherein the switching frequency and switching duty cycle of the configurable buck-boost converter stage are independent of the switching frequency and duty cycle of the unregulated DC/DC stage.

16. The switching power converter of claim 1, wherein said buck-boost converter stage further comprises a power controller adapted to control said buck-boost converter stage to produce said output voltage Vout.

17. The switching power converter of claim 1, wherein said mode selection module is arranged to receive said bus voltage at a first input and said output voltage at a second input, and to determine an operation mode of said buck-boost converter based on at least said bus voltage and said output voltage.

18. The switching power converter of claim 1, wherein said buck-boost converter stage comprises a first freewheeling diode connected between the first end of said inductor and the circuit common point; and a second freewheeling diode connected between the second end of said inductor and said capacitor.

19. The switching power converter of claim 1, wherein said at least one buck-boost converter stage is comprised of a plurality of buck-boost converters such that each of said plurality of buck-boost converters is adapted to provide a respective output voltage Vout.

20. The switching power converter of claim 19, wherein each of said buck-boost converter stages comprises: an inductor; a capacitor; a first switch connected between an input to said buck-boost converter and the first end of said inductor; a second switch connected between a first end of said inductor and a circuit common point; a third switch connected between the second end of said inductor and said circuit common point; and a fourth switch connected between the second end of said inductor and said capacitor; said switching power converter arranged to operate said switches as needed to produce a desired output voltage Vout across said capacitor.

21. The switching power converter of claim 19, wherein each of said buck-boost converter stages comprises: an inductor; a capacitor; a first switch connected between an input to said buck-boost converter and the first end of said inductor; a first freewheeling diode connected between a first end of said inductor and a circuit common point; a second switch connected between the second end of said inductor and said circuit common point; and a second freewheeling diode connected between the second end of said inductor and said capacitor; said switching power converter arranged to operate said switches as needed to produce a desired output voltage Vout across said capacitor.

* * * * *

UNITED STATES PATENT AND TRADEMARK OFFICE
CERTIFICATE OF CORRECTION

| | |
|---|---|
| PATENT NO. | : 9,041,372 B2 |
| APPLICATION NO. | : 13/799492 |
| DATED | : May 26, 2015 |
| INVENTOR(S) | : Xie et al. |

Page 1 of 1

It is certified that error appears in the above-identified patent and that said Letters Patent is hereby corrected as shown below:

On the Title Page, in item (73), in "Assignee", in column 1, line 1, after "Global", insert --, Hamilton--, therefor Signed and Sealed this
Tenth Day of November, 2015

Michelle K. Lee
*Director of the United States Patent and Trademark Office*